United States Patent [19]

Bean

[11] Patent Number: 5,613,512
[45] Date of Patent: Mar. 25, 1997

[54] BLIND STRUCTURE FOR USE WITH TREE STAND

[75] Inventor: Ron M. Bean, Cedar Rapids, Iowa

[73] Assignees: David R. Forbes; Carman S. Forbes, both of Cedar Rapids, Iowa

[21] Appl. No.: 550,168

[22] Filed: Oct. 30, 1995

[51] Int. Cl.[6] ................................................ A01M 31/00
[52] U.S. Cl. ...................... 135/90; 135/117; 43/1
[58] Field of Search ...................... 135/90, DIG. 901, 135/117; 43/1

[56] References Cited

U.S. PATENT DOCUMENTS

| | | | |
|---|---|---|---|
| 2,816,297 | 12/1957 | Stanley | 43/1 X |
| 3,116,808 | 1/1964 | Riley. | |
| 4,219,036 | 8/1980 | Biggs | 135/97 X |
| 4,410,066 | 11/1983 | Swett. | |
| 4,505,286 | 3/1985 | Madion | 135/90 |
| 4,683,672 | 8/1987 | Davis | 135/901 X |
| 4,716,919 | 1/1988 | Griffin | 135/901 X |
| 4,805,655 | 2/1989 | Justice | 135/90 |
| 4,813,441 | 3/1989 | Kepley | 135/901 X |
| 4,825,578 | 5/1989 | Robinson | 43/1 |
| 5,062,234 | 11/1991 | Green. | |
| 5,127,180 | 7/1992 | Norton et al. | 135/901 |
| 5,377,711 | 1/1995 | Mueller | 135/901 X |
| 5,383,061 | 1/1995 | Lanier | 43/1 X |

*Primary Examiner*—Wynn E. Wood
*Attorney, Agent, or Firm*—Simmons, Perrine, Albright & Ellwood, PLC

[57] ABSTRACT

A blind structure for a tree stand includes an outer beam secured across an outer end of the tree stand platform and an inner beam connected across the platform at a position spaced inwardly from the outer beam. Each beam has a pivotal socket member, positioned at each of its outer ends, which has a socket to receive an upwardly extending rod. A blind panel member has sleeves at its ends and at a medial region which are received over the rods to surround the tree stand platform on an outer end and along the sides.

20 Claims, 2 Drawing Sheets

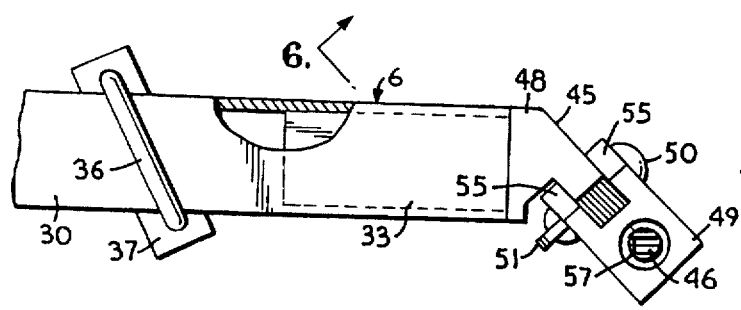
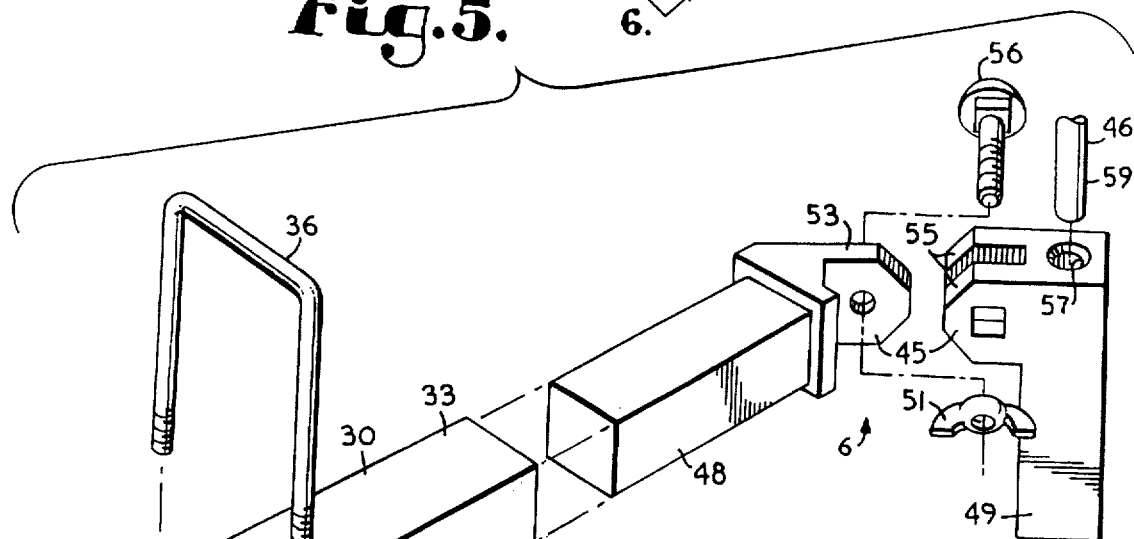
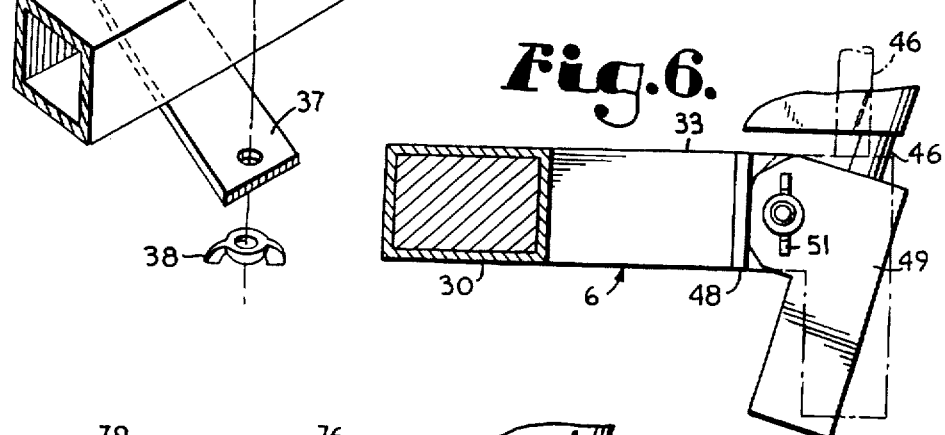
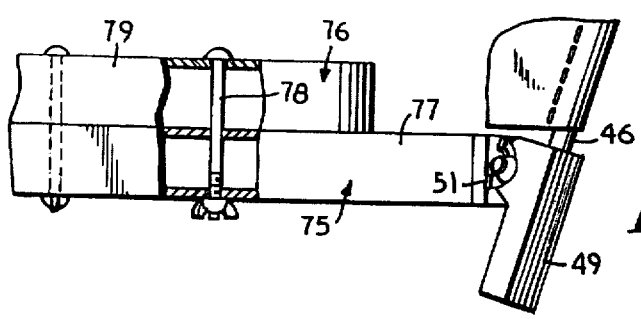

BLIND STRUCTURE FOR USE WITH TREE STAND

BACKGROUND OF THE INVENTION

Hunters sometimes use tree stands to position themselves to observe a wider area in which game animals, such as deer, might appear. A tree stand is a platform which is temporarily mounted on a tree trunk to support a hunter, photographer, or other wildlife observer at an elevated position to see the animals without being seen or otherwise detected. Tree stands are often used in combination with camouflaged clothing to further obscure the observer.

Another device often employed is a blind structure to conceal the hunter from the game. Blinds are usually formed of a fabric which is camouflaged with colors and patterns to blend in with the surroundings. The blind fabric is stretched on some kind of a framework, which may be as simple as several spaced apart rods or poles penetrated into the ground. Other configurations of blinds are well known. Blind structures are sometimes used on tree stands to give the hunter the advantage of an elevated viewpoint along with more complete concealment.

A tree stand must be sturdy enough to safely support the weight of the hunter, while its mounting structure must reliably mount the stand on a tree trunk, preferably without damaging the tree. A characteristic which is very desirable is lightness of weight. Hunting is often pursued in areas remote from roads or even trails accessible by vehicles. Thus, a tree stand must often be packed in and packed out. Adding a blind structure increases the weight which must be carried. Another characteristic of both tree stands and blinds is ease of setup and takedown, since these activities may occur in times of diminished light.

SUMMARY OF THE INVENTION

The present invention provides a blind structure for a tree stand which adds minimal weight to the tree stand and which is particularly convenient to set up and take down in the field. The tree stand with which the blind structure of the present invention is intended to be used is formed by a peripherally extending platform frame member generally forming a somewhat teardrop shape and having an area enclosed by the frame member generally covered with a metal mesh. An inner end of the frame forms an abutment which engages the trunk of a tree. A seat frame extends upward and toward the tree and has a flexible member connected thereto, such as a chain, cable, or rope, which encircles the trunk. A seat member is mounted on the seat frame.

The blind structure includes a pair of cross beams which are connected to the peripheral frame member of the platform. An outer beam is connected to the platform frame at an outer end, and an inner beam is positioned at a location spaced inward from the outer end of the platform. Preferably, the cross beams are connected to the platform frame by fasteners, such as U-bolts, which do not require drilling, and possible weakening, the platform frame. The cross beams are preferably lightweight tubular members, such as aluminum tubes with square cross section. The outer ends of the cross beams are provided with socket members which receive blind support rods on which a blind panel member is erected.

Each socket member includes a mounting stub, which is generally frictionally received in the end of a cross beam, and a bracket which is pivotally connected to the mounting stub. The bracket has a rod receiving socket which frictionally retains the lower end of a rod. The rod may be formed of a glass fiber composite and may have a metal ferrule at a lower end for engagement with the socket.

The blind panel is formed of a lightweight fabric and has a camouflage pattern printed thereon of a color and pattern appropriate for the locale and season in which the blind structure is to be used. Additionally, incisions may be cut into the panel fabric of a shape which will simulate the flutter of leaves in response to breezes in order to provide a more natural appearance. The preferred blind panel member is formed by a front panel and two side panels. Rod receiving sleeves are formed at the rear ends of the side panels and at corners separating the side panels from a middle region forming the front panel.

The end sleeves are received on rods extending upward from the inner beams, while the middle sleeves are received on rods on the outer beam. Pivoting of the components of the socket members allows the rods to be angled somewhat outwardly to stretch the blind panels to a desired degree of tautness. This, additionally, expands the space enclosed by the blind panel for the comfort of the tree stand occupant. The socket members include bolts and wing nuts to allow the rods to be releasably secured in a desired angular relationship.

In an alternative embodiment of the blind structure of the present invention, in which the tree stand is designed for use with such a blind structure, the inner and outer cross beams are secured to the platform peripheral frame member by fasteners, such as bolts, which pass through the frame member. Finally, the tree stand platform can also be designed with the pivotal socket members of the present invention integrated into the platform frame member or members.

OBJECTS AND ADVANTAGES OF THE INVENTION

The principal objects of the present invention are: to provide an improved blind structure for use with a tree stand; to provide such a structure for a type of tree stand having a platform frame formed by a peripherally extending frame member; to provide such a structure including an outer beam connected across an outer end of the platform frame and an inner beam connected across the platform frame at a position spaced inward from the outer beam; to provide such a structure including socket members pivotally connected to the ends of the beams and having sockets to receive lower ends of rods which support a fabric blind panel member; to provide such a structure in which the pivotal socket members enable the rods to pivot outwardly to remove slack from or stretch the blind panel member; to provide such a structure that is suitable for use with a variety of existing types of tree stands; to provide such a structure that is lightweight; to provide such a structure that is convenient to assemble and disassemble; to provide such a structure that can be secured to a tree stand without drilling or otherwise altering the framework of the tree stand; and to provide such a blind structure for a tree stand that is economical to manufacture, that is convenient in use, and that is particularly well adapted for its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a greatly enlarged fragmentary top plan view of an end of one of the cross beams of the blind structure and illustrates details of a pivotal rod socket bracket which receives a blind panel support rod.

FIG. 5 is a fragmentary exploded perspective view illustrating further details of the pivotal rod socket bracket of the blind structure.

FIG. 6 is a cross sectional view taken on line 6—6 of FIG. 4 and illustrates pivoting of the socket bracket to stretch the blind panel fabric to a taut condition.

FIG. 7 is a fragmentary side elevational view of a modified embodiment of the cross beams of the blind structure of the present invention and illustrates an alternative arrangement for connecting the cross beam to the tree stand platform frame.

DETAILED DESCRIPTION OF THE INVENTION

Figure 1:
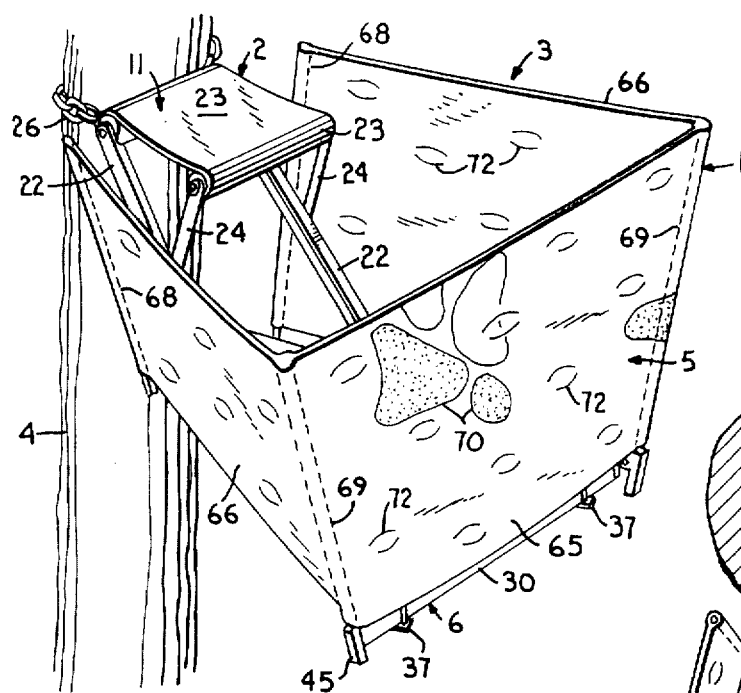
FIG. 1 is a perspective view illustrating a blind structure for a tree stand and embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a blind structure for use with tree stand 2 and which embodies the present invention. The blind structure 1 and tree stand 2 form an elevated blind assembly 3 (FIG. 1 ) for providing an elevated and concealed observation station positioned on the trunk 4 of a tree for a hunter, wildlife photographer, or other wildlife observer. The blind structure 2 generally includes a blind panel member 5 and a blind structure framework 6 which supports the blind panel member 5 in surrounding and concealing relation to an occupant of the tree stand 2.

Figure 2:
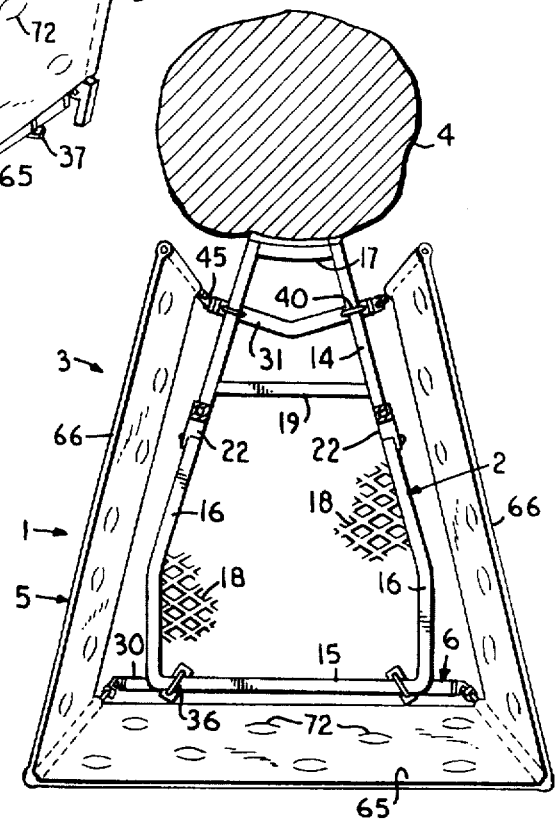
FIG. 2 is a fragmentary top plan view of the blind structure and illustrates details of the tree stand on which the blind structure is used.
Figure 3:
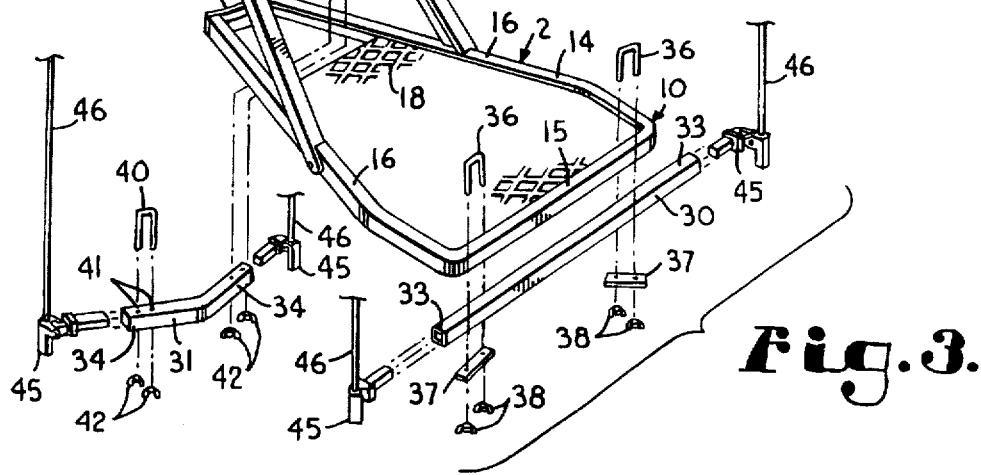
FIG. 3 is a fragmentary exploded perspective view of the blind structure and illustrates details of connection of the blind structure to the tree stand, including cross beams thereof.

Referring particularly to FIGS. 2 and 3, the tree stand 2 includes a platform assembly 10 having a seat assembly 11 extending thereabove. The illustrated platform assembly 10 is formed by a peripheral platform frame member 14 which is generally formed into a flattened teardrop shape as seen from above (FIG. 2). The frame member 14 has a generally straight outer end segment 15, mirror image side segments 16, and a concave inner end segment 17. The area enclosed by the platform frame member 14 is covered, such as by metal mesh 18, that terminates at a medial cross bar 19 extending between the side segments 16. The inner end segment 17 forms an abutment which bears against the tree trunk 4. The platform 10 may include additional frame members (not shown) which extend beneath the mesh 18 between the side segments 16 and between the outer end segment 15 and the cross bar 19 to further reinforce the mesh 18. The platform member 14 may be tubular, channel, or angle stock constructed of a lightweight alloy, such as aluminum, which is bent to form the required shape. The inner end segment 17 may be attached to inner ends of the side segments 16, such as by welding or fasteners (not shown).

The seat assembly 11, if any, generally includes a pair of legs 22 having lower ends pivotally connected to the side segments 16 of the platform frame member 14 and upper ends connected to an inner end of a seat member 23. A pair of seat braces 24 extend between an outer end of the seat member 23 and the legs 22. The lower ends of the seat braces 24 may be connected to the legs 22 by releasable fasteners (not detailed) whereby the lower ends of the braces 24 can be disconnected from the legs 22 to allow the legs 22 and seat member 23 to be folded flat against the platform assembly 10 for carrying or storage of the tree stand 2. The upper ends of the legs 22 have a flexible tree engaging member 26 connected thereto which encircles the tree trunk 4, such as a length of chain, cable, rope, or other suitable arrangement. The weight of an occupant on the seat 23 and platform 10 causes the chain 26 to be frictionally engaged with the tree trunk 4 to retain the tree stand 2 in position on the tree trunk 4.

The blind structure framework 6 includes an outer cross beam 30 and an inner cross beam 31. The illustrated beams 30 and 31 are preferably formed of tubes having square cross section and constructed of aluminum or other lightweight alloy. The outer beam 30 has opposite ends 33 and is a straight member, while the illustrated inner beam 31 has opposite ends 34 and is angled, as shown in FIGS. 2 and 3. The outer beam 30 is removably secured across the outer end of the platform 30 along the outer end segment 15, preferably by fasteners that pass about the frame member 14, to avoid drilling of the platform frame member 14. On the illustrated blind structure 1, U-bolts 36, retainer bars 37, and wing nuts 38 are used to connect the outer beam 30 to the outer end segment 15. The inner beam 31 may be connected to the frame member 14 in a manner similar to that of the outer beam 30. However, the illustrated inner beam 31 is connected by U-bolts 40 which pass about the side segments 16 of the frame member 14 and through holes 41 drilled through the inner beam 31 where the U-bolts 40 are secured by wing nuts 42. Alternatively, the U-bolts may encircle the inner beam 31, in which case the holes 41 can be eliminated. Further, the inner beam 31 may be straight, in which case it may, if desired, have substantially the same length as the outer beam 30. Each of the outer ends 33 and 34 of the inner and outer beams 30 and 31 receives a socket member 45 which receives a blind support rod 46.

FIGS. 4–6 illustrate details of the socket members 45. Each socket member 45 includes a mounting stub 48 and a rod receiving bracket 49 that is pivotally connected to the stub 48 by a bolt 50 and a wing nut 51. The mounting stub 48 is received in the end 33 of the outer beam 30 or the end 34 of the inner beam 31. The illustrated mounting stub 48 is frictionally retained in the beam end 33 or 34. Alternatively, the mounting stub 48 could be welded, glued, clamped, or otherwise fastened in place.

The mounting stub 48 has a pivot connection tab 53 extending therefrom at an angle, such as approximately 45 degrees. The bracket 49 has a pair of connection tabs 55, between which the tabs 53 of the stub 48 are received. The bolt 50 passes through apertures formed in the tabs 53 and 55, and the wing nut 51 clamps the tab 53 between the tabs 55. The wing nut 51 may be tightened to provide a desired degree of friction between the tabs 53 and 55 or may be tightened further to secure a desired angular relationship between the bracket 49 and the stub 48. The bracket 49 has a rod receiving socket 57 bored therein to frictionally receive a lower end 59 of a rod 46.

The illustrated blind panel member 5 includes an outer or front panel 65 and a pair of side panels 66. Each of the panels 65 and 66 is generally trapezoidal in shape. Rear ends of the side panels 66 have end sleeves 68, while medial sleeves 69 are used to form corners between the front panel 65 and the side panels 66. The end sleeves 68 are positioned to be received over the rods 46 extending upward from socket members 45 on the inner beam 31, and the medial sleeves 69 are positioned to be received over the rods 46 extending from the outer beam 30. The panel member 5 is formed of a lightweight fabric having a colored camouflage pattern 70 printed thereon. The panels 65 and 66 are provided with incisions 72 which tend to flutter like leaves by action of breezes to give the flat panels 65 and 66 a more natural appearance.

The blind structure 1 may be assembled onto the tree stand 2 entirely in the field, or it may be partially preassembled prior to taking it out to the site for use. Thus, the beams 30 and 31 with socket members 45 attached may be connected to the platform frame member 14. Alternatively, the rods 46 may be fixedly attached to the sleeves 68 and/or 69. The rods 46 may be inserted into the sleeves 68 and 69 and the panel member 5 rolled up about the rods 46. In the field, once the tree stand 2 has been set up on the tree trunk 4, the hunter can climb onto the platform 10, unroll the panel member 5, and insert the rods 46 into the sockets 57 in the socket members 45. The rods 46 can then be angled outward to expand the space enclosed by the blind structure 1 and remove slack from the panels 65 and 66.

FIG. 7 illustrates an alternative embodiment 75 of the blind structure according to the present invention. The blind structure 75 is intended for use with a tree stand 76 which is originally designed to have beams 77 of the blind structure 75 connected thereto by bolts 78 which pass through holes drilled through a frame member 79 of the tree stand 76 without substantially weakening the frame member 79. In other respects, the blind structure 75 is substantially similar to the blind structure 1.

It is to be understood that while certain forms of the present invention have been illustrated and described herein, it is not to be limited to the specific forms or arrangement of parts described and shown.

What is claimed and desired to be secured by Letters Patent is as follows:

1. A blind structure attached to a tree stand having a platform supported on a trunk of a tree and having an outer periphery, said blind structure comprising:
   (a) a plurality of socket members connected to the platform in spaced relation along the outer periphery;
   (b) a plurality of elongated blind support rods, each rod being removably received in a respective one of said socket members; and
   (c) a blind panel member engaged with each of said rods in at least partially surrounding relation to the platform to thereby obscure a person supported by the platform.

2. A structure as set forth in claim 1 wherein at least one of said socket members is pivotally connected to the platform.

3. A structure as set forth in claim 1 wherein said panel member is formed of a flexible material.

4. A structure as set forth in claim 1 wherein:
   (a) said blind panel member is formed of a flexible material and has opposite ends; and
   (b) said blind panel member has a rod receiving sleeve formed at each of said opposite ends, each sleeve being received on a respective one of said rods.

5. A structure as set forth in claim 1 wherein:
   (a) said blind panel member is formed of a flexible material and has opposite ends and a middle region;
   (b) said blind panel member has a rod receiving sleeve formed at each of said opposite ends and along said middle region, each sleeve being received on a respective one of said rods; and
   (c) each of said socket members is pivotally connected to the platform to enable pivoting said rods outwardly from the platform to thereby stretch said blind panel member to a selected taut condition.

6. A structure as set forth in claim 1 wherein:
   (a) said blind panel member is formed of a flexible material; and
   (b) said blind panel member has a plurality of incisions formed therein which, when acted upon by wind, give an appearance of tree leaves being moved by the wind.

7. A blind structure attached to a tree stand having a platform frame with an outer end and being supported on a trunk of a tree, said blind structure comprising:
   (a) an elongated outer beam removably secured across the outer end of the platform frame, said outer beam having opposite ends;
   (b) an elongated inner beam removably secured across the platform frame at a position spaced inwardly from the outer end of the platform frame, said inner beam having opposite ends;
   (c) a respective socket member positioned at each of said opposite ends of said inner and outer beams;
   (d) a respective elongated blind support rod removably received in each of said socket members; and
   (e) a blind panel member removably engaged with each of said rods in at least partially surrounding relation to the tree stand to thereby obscure a person supported by the tree stand.

8. A structure as set forth in claim 7 wherein:
   (a) the platform frame includes a peripheral platform frame member; and
   (b) at least one of said beams is connected to the platform frame member by a connector member which passes about the platform frame member.

9. A structure as set forth in claim 8 wherein said connector member includes a U-bolt.

10. A structure as set forth in claim 7 wherein at least one of said socket members is pivotally connected to the beam associated therewith.

11. A structure as set forth in claim 7 wherein each of said socket members includes:
   (a) a mounting stub adapted for connection to an associated one of said beams; and
   (b) a rod support bracket pivotally connected to said mounting stub and having a blind support rod receiving socket positioned therein.

12. A structure as set forth in claim 11 and including a pivot fastener engaged between said stub and said rod support bracket, said pivot fastener being operable to releasably secure said rod support bracket in a selected angular relationship with said mounting stub.

13. A structure as set forth in claim 7 wherein:
   (a) said blind panel member is foraged of a sheet of flexible material and has opposite ends and a middle region; and
   (b) said blind panel member is removably engaged with said rods with said ends of said blind panel member engaging rods received in said socket members on said inner beam and said middle region of said blind panel number engaging rods received in said socket members on said outer beam.

14. A structure as set forth in claim 13 wherein said blind panel member includes a pair of end rod receiving sleeves formed respectively at said opposite ends of said blind panel member.

15. A structure as set forth in claim 13 wherein said blind panel member includes a pair of middle rod receiving sleeves formed in spaced apart relation at said middle region of said blind panel member to receive rods on said outer beam.

16. A structure as set forth in claim 13 wherein said blind panel member includes:
   (a) a pair of end rod receiving sleeves/brined respectively at said opposite ends of said blind panel member; and
   (b) a pair of middle rod receiving sleeves formed in spaced apart relation at said middle region of said blind panel member to receive rods on said outer beam.

17. A structure as set forth in claim 13 wherein each of said socket members is pivotally connected to an associated beam to enable pivoting said rods outwardly from said platform frame to thereby stretch said blind panel member to a selected taut condition.

18. A structure as set forth in claim 17 wherein:
   (a) said blind panel member is formed of a flexible material; and
   (b) said blind panel member has a plurality of incisions formed therein which, when acted upon by wind, give an appearance of tree leaves being moved by the wind.

19. A tree stand blind structure for use on a trunk of a tree and comprising:
   (a) a tree stand platform frame having an outer end;
   (b) a tree mounting member connected to said frame and adapted for mounting said frame on a trunk of a tree;
   (c) a pair of blind support cross beams including a outer beam and an inner beam, each of said beams having respective opposite ends, said outer beam being connected across said frame at said outer end of said frame, and said inner beam being connected across said frame at a position spaced inwardly from said outer end of said frame;
   (d) a plurality of socket members including a socket member at each of said opposite ends of each of said cross beams, each socket member including a mounting stub connected to the associated beam and a support bracket pivotally connected to said stub, said bracket having a rod receiving socket therein;
   (e) a plurality of blind support rods including a respective rod received in each of said socket members;
   (f) a blind panel member formed of flexible material and having opposite ends and a middle region;
   (g) a plurality of rod receiving sleeves formed on said blind panel member including a pair of opposite end sleeves positioned respectively at said opposite ends of said blind panel member and a pair of spaced apart middle sleeves positioned in spaced apart relation at said middle region of said blind panel member, said end sleeves receiving said rods in said socket members on said inner beam, and said middle sleeves receiving said rods received in said socket members on said outer beam; and
   (h) said rods being pivoted outwardly from said platform frame to stretch said blind panel member to a selected taut condition.

20. A structure as set forth in claim 19 wherein said blind panel member has a plurality of incisions formed therein which, when acted upon by wind, give an appearance of tree leaves being moved by the wind.

* * * * *

UNITED STATES PATENT AND TRADEMARK OFFICE
CERTIFICATE OF CORRECTION

PATENT NO. : 5,613,512
DATED : March 25, 1997
INVENTOR(S) : Ron M. Bean

It is certified that error appears in the above-indentified patent and that said Letters Patent is hereby corrected as shown below:

In Column 7, Claim 13, line 4: delete "foraged" and
    insert therefor --formed-- .

In Column 7, Claim 13, line 11: delete "number" and
    insert therefor --member-- .

In Column 7, Claim 16, line 24: delete"sleeves/brined"
    and insert therefor --sleeves formed-- .

Signed and Sealed this

Fifth Day of August, 1997

Attest:

BRUCE LEHMAN

Attesting Officer

Commissioner of Patents and Trademarks